(12) United States Patent
Velusamy

(10) Patent No.: US 9,742,821 B2
(45) Date of Patent: *Aug. 22, 2017

(54) METHOD AND SYSTEM FOR DYNAMIC CONTENT DELIVERY

(71) Applicant: Verizon Patent and Licensing Inc., Basking Ridge, NJ (US)

(72) Inventor: Umashankar Velusamy, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 196 days.

This patent is subject to a terminal disclaimer.

(21) Appl. No.: 13/847,856

(22) Filed: Mar. 20, 2013

(65) Prior Publication Data

US 2013/0219001 A1 Aug. 22, 2013

Related U.S. Application Data

(63) Continuation-in-part of application No. 12/342,467, filed on Dec. 23, 2008, now Pat. No. 8,621,089.

(51) Int. Cl.
*H04L 29/06* (2006.01)

(52) U.S. Cl.
CPC ........ *H04L 65/403* (2013.01); *H04L 65/4015* (2013.01); *H04L 65/4084* (2013.01)

(58) Field of Classification Search
None
See application file for complete search history.

(56) References Cited

U.S. PATENT DOCUMENTS

| | | | |
|---|---|---|---|
| 5,490,208 A | 2/1996 | Remillard | |
| 6,101,486 A * | 8/2000 | Roberts et al. | 705/14.66 |
| 6,175,619 B1 * | 1/2001 | DeSimone | 379/202.01 |
| 6,571,216 B1 | 5/2003 | Garg et al. | |
| 6,636,831 B1 * | 10/2003 | Profit et al. | 704/275 |
| 6,697,097 B1 * | 2/2004 | Parker | H04L 29/12018 348/14.08 |
| 6,788,770 B1 * | 9/2004 | Cook | H04L 12/2854 379/100.01 |
| 6,965,614 B1 * | 11/2005 | Osterhout et al. | 370/466 |
| 7,237,004 B2 * | 6/2007 | Slobodin et al. | 709/204 |
| 7,257,202 B2 * | 8/2007 | Umemura et al. | 379/88.14 |
| 7,283,154 B2 * | 10/2007 | Shachar et al. | 348/14.08 |
| 7,386,318 B2 | 6/2008 | Moon et al. | |
| 7,457,397 B1 * | 11/2008 | Saylor et al. | 379/88.17 |
| 7,590,547 B2 * | 9/2009 | Lagadec | G06Q 30/02 705/307 |
| 7,664,680 B2 * | 2/2010 | Pitkow | 705/26.3 |
| 7,840,689 B2 | 11/2010 | Stewart | |

(Continued)

*Primary Examiner* — Tejis Daya

(57) ABSTRACT

An approach is provided for sharing dynamic content among users. A communication system receives a request, via a voice communication session with a user device, for visual content that includes dynamic content. The communication system determines one or more of a plurality of destination devices to direct the visual content, wherein the one or more destination devices includes the user device. The communication system then initiates transmission of the visual content to the one or more destination devices over a communication session that is separate from the voice communication session.

17 Claims, 8 Drawing Sheets

(56) References Cited

U.S. PATENT DOCUMENTS

| | | | |
|---|---|---|---|
| 7,924,798 B1* | 4/2011 | Brown | H04L 69/16 370/341 |
| 7,948,953 B2 | 5/2011 | Melkote et al. | |
| 8,046,356 B2* | 10/2011 | Schultz et al. | 707/722 |
| 8,526,336 B2* | 9/2013 | Sarkar et al. | 370/261 |
| 2001/0032335 A1* | 10/2001 | Jones | 725/105 |
| 2002/0007318 A1 | 1/2002 | Alnwick | |
| 2002/0040325 A1 | 4/2002 | Takae et al. | |
| 2002/0073179 A1 | 6/2002 | Mackintosh et al. | |
| 2002/0188746 A1* | 12/2002 | Drosset et al. | 709/231 |
| 2002/0194589 A1 | 12/2002 | Cristofalo et al. | |
| 2003/0023730 A1* | 1/2003 | Wengrovitz | H04L 29/06 709/227 |
| 2003/0046705 A1* | 3/2003 | Sears | 725/106 |
| 2003/0191821 A1 | 10/2003 | Schena et al. | |
| 2004/0204047 A1* | 10/2004 | Steed | 455/556.1 |
| 2005/0165911 A1 | 7/2005 | Homiller | |
| 2005/0183121 A1* | 8/2005 | Kim | G06F 17/30029 725/46 |
| 2005/0198208 A1 | 9/2005 | Nystrom | |
| 2005/0234829 A1* | 10/2005 | Williams | G06F 21/10 705/51 |
| 2007/0208688 A1 | 9/2007 | Bandhole et al. | |
| 2007/0294721 A1 | 12/2007 | Haeuser et al. | |
| 2007/0296572 A1* | 12/2007 | Fein et al. | 340/539.13 |
| 2008/0021957 A1* | 1/2008 | Medved et al. | 709/203 |
| 2008/0084872 A1* | 4/2008 | Li | H04L 12/66 370/352 |
| 2008/0271072 A1* | 10/2008 | Rothschild et al. | 725/35 |
| 2008/0276304 A1* | 11/2008 | Maffione | H04L 63/02 726/4 |
| 2009/0239552 A1 | 9/2009 | Churchill et al. | |
| 2009/0307361 A1* | 12/2009 | Issa | H04L 63/105 709/229 |

* cited by examiner

METHOD AND SYSTEM FOR DYNAMIC CONTENT DELIVERY

CROSS-REFERENCE TO RELATED APPLICATIONS

This application is a continuation-in-part of U.S. application Ser. No. 12/342,467, filed Dec. 23, 2008, the entirety of which is incorporated herein by reference.

BACKGROUND INFORMATION

Telecommunication systems and services are critical in supporting efficient commerce, networking, data dissemination, etc. By way of example, these systems are routinely used for purchasing products and services, as well as accessing customer service representatives. As such, customers can conveniently purchase a multitude of goods and services from nearly anywhere. With traditional telecommunication systems (e.g., automated voice response systems), customers can call a company to purchase a product or connect to a customer service or sales representative are required to navigate through a series of buttons and menus using the telephone. When purchasing a product, the user is generally required to know the particular product description prior to completing an order. The conventional phone-based communication does not lend itself offering alternative and/or sufficient information about the products to the user, as users typically require a visual inspection of the product and instructions on how to use the product or require further inspection on the characteristics of a product, as compared to how an advertisement shows how this same product performs. Although the voice or image response system can be programmed to provide the customer with significant information about products and services, dynamic content associated with the product cannot be conveyed without significant user configuration of content sharing equipment. That is, conventional systems place the burden of purchasing and configuring equipment to share dynamic content on the user. In particular, the network service provider does not provide an easily utilized system accessible upon a simple command to share dynamic content between users. Consequently, for most typical users, dynamic content sharing is relatively costly and time consuming to install.

Therefore, there is a need for an approach to share dynamic content through simplified and adaptable network services accessible to users.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for providing visual content, including dynamic visual content, to a service requester are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to commercial transactions, it is contemplated that the approach for providing visual content, including dynamic visual content, to one or more user devices has other applications, such as video conferencing, telemedicine, businesses monitoring, remote identify verification, on-demand broadcast services, etc. Additionally, the services may be operated by a third party relative to the users and the network operators. Further, service agents may be located on-site, off-site, or a combination thereof.

Moreover, although various exemplary embodiments are described with respect to a wireless device, it is contemplated that these embodiments have applicability to any device capable of communicating over a network, such as a home communication terminal (HCT), a digital home communication terminal (DHCT), television system set-top box (STB), landline connected to a Public Switched Telephone Network (PSTN), a personal digital assistant (PDA), a smart phone, laptop computer, and/or a personal computer (PC), as well as other like technologies and customer premises equipment (CPE).

Figure 1:
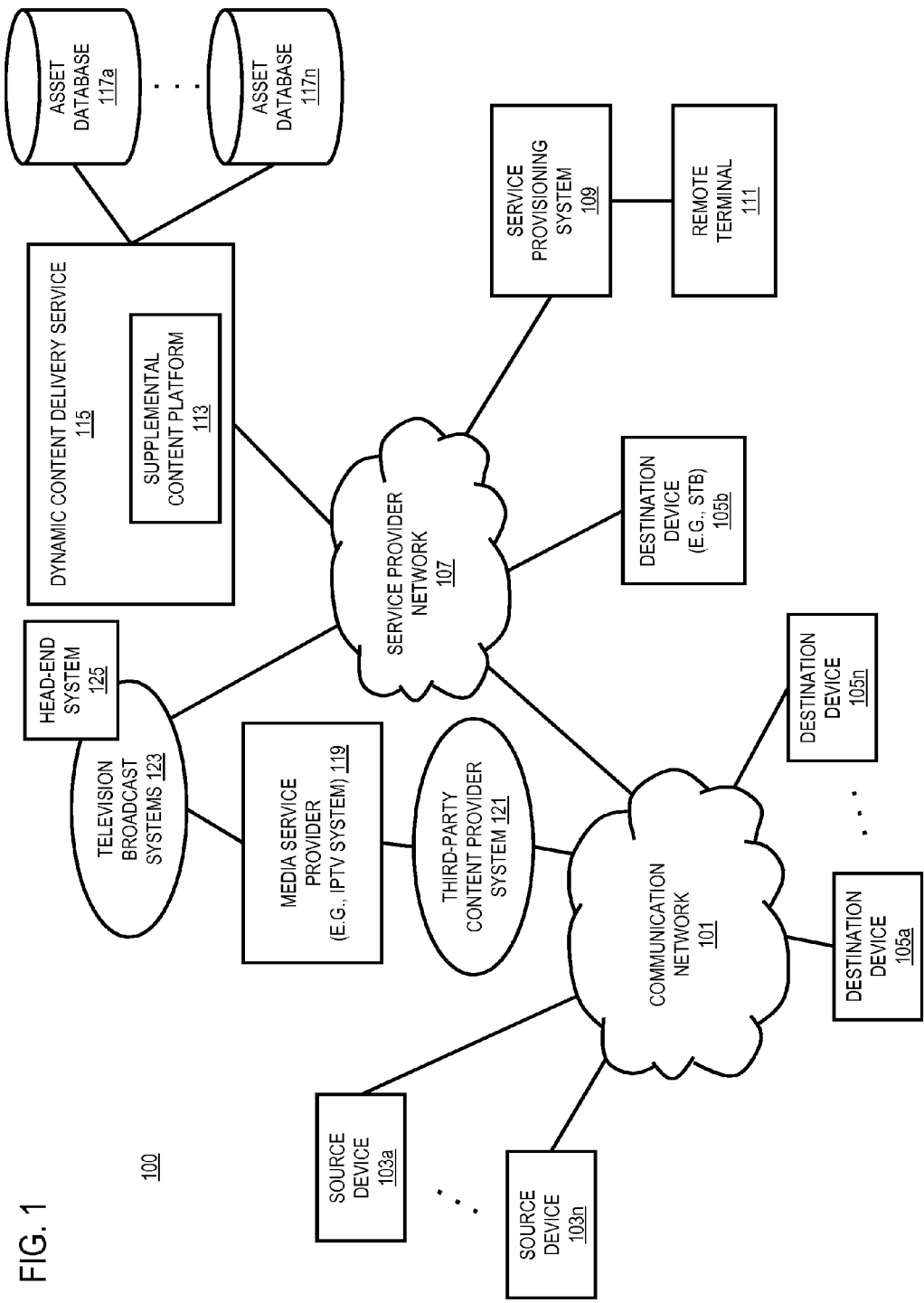
FIG. 1 is diagram of a system capable of providing dynamic content delivery service, according to an exemplary embodiment.

FIG. 1 is diagram of a system 100 capable of providing dynamic content delivery, according to an exemplary embodiment. For the purpose of illustration, system 100 employs dynamic content delivery service 115 to share dynamic content delivery from one or more source devices 103*a*-103*n* to one or more destination devices 105*a*-105*n*. A user (e.g., subscriber to) of dynamic content delivery service 115 may register one or more source devices with the service provider such that the devices are authorized to deliver content. It is contemplated that other devices may also be registered to the service depending on the needs of the user. For example, remote terminal 111 of service provisioning system 109 may also be registered for dynamic content delivery. Moreover, dynamic content delivery service 115, in certain embodiments, can be deployed in the form of an ecosystem.

As used herein, the term "ecosystem" refers to a combination of software applications and computing and data networking resources of one or more service providers managing and facilitating the delivery of dynamic content for a particular user. For example, a subscriber may develop software applications to better deliver its services to its customers including, for example, the clients of a real estate brokerage service or a pizza delivery service. Additionally, either the service provider or a third-party may develop specific applications based on, for example, a set of programming interfaces (APIs) developed by the service provider. Thus, for example, a real estate brokerage service may create an application to provide virtual tours of listed properties to assist both agents and clients of the service. The agent may be able to add, remove or modify videos or photos of properties. The application may further provide an agent of the service to add, move or remove applications and allow other users to build applications that, for example, enable the agent's customers to visualize a house or access information about any property in a portfolio.

As shown, dynamic content delivery service 115 may be a part of or connected to service provider network 107. In one embodiment, dynamic content delivery service 115 may be a software application running on one or more application servers (not shown for illustrative convenience) that are part of the service provider's core networking infrastructure. It is contemplated that such a service may also be implemented as a cloud-based service hosted by the service provider or a third-party. Dynamic content delivery service 115 may also be configured to provide an API accessible to software programmers developing applications for a particular user of the service.

As used herein, the term "dynamic content" may refer to real-time video content, and optionally stored visual content, associated with one or more transactions. It may also be understood to refer to other forms of "on-the-fly" form generating technologies, including information generated by automated scripts accessing storage systems containing data that may be continuously being updated by various sources. In certain embodiments, the dynamic content may be in form of a live feed (e.g., broadcast television, real-time video streaming, etc.). For example, when a transaction involves a physical object (e.g., flower bouquet), the dynamic content may be a live image of the flower bouquet, but may also include an automatically generated purchase order, shipping and handling order, and advertisements of items related to the current purchase. Also, as used herein, the term "transaction" includes commercial transactions (e.g., financial transactions, real estate transaction, etc.), non-commercial transactions (e.g., donations, social club outings, volunteering registrations, etc.), etc. for exchange or transfer of data, goods, services, funds, etc.

In the example of FIG. 1, dynamic content delivery service 115 may be connected to one or more asset databases 117a-117n. In one embodiment, a particular database (e.g., asset database 117a) may store data, including visual content, of a specific user. It is contemplated that the stored data may include, for example, visual content, accounting data, subscriber information, and authorization information as well as audio, video, and multimedia content.

As shown, dynamic content delivery service 115 may include supplementary content platform 113 for the sharing of non-dynamic content with one or more destination devices 105. In one embodiment, supplementary content platform 113 may utilize the same or related software, hardware, and data storage resources as dynamic content delivery service 115. A particular subscriber of supplementary content platform 113 may also be subscribed to dynamic content delivery service 115 (e.g., as an "add-on service"), in which case certain data or information belonging to the subscriber may be shared between the services instead of being maintained separately. It is contemplated that a subscriber to both services may seamlessly switch between the services depending on the type of content (e.g., dynamic or non-dynamic) being shared with one or more destination devices 105.

As further shown, the system 100 may include service provisioning system 109 that can be accessed via a remote terminal 111. In one embodiment, service provisioning system 109 may be operated by a subscriber to provision various commercial or non-commercial services offered by the subscriber. For example, a service provisioning system of a real estate brokerage service may allow an agent of the service to accept a request for viewing a particular property. As another example, an infant day care service may utilize service provisioning system 109 to accept a request for day care services at a particular time and location with a specific staff member on duty. In order to facilitate such exemplary transactions, service provisioning system 109 may utilize a source device (e.g., source device 103a) or remote terminal 111 to provide dynamic content of interest to the customer requesting the service. For instance, an on-site agent of the exemplary real estate brokerage service may provide a visual tour of a property using her mobile phone. The exemplary day care service may provide a visual tour of the particular location selected by a customer and a staff member on duty at the selected location may communicate with the customer via a live video session using a webcam-equipped computer.

As shown, system 100 may include television broadcast system 123. Television broadcast system 123 may deliver content (received, for example, from head-end system 125) to one or more destination devices 105 via service provider network 107 or other delivery systems including, for example, media service provider 119 and third-party content provider 121. Service provider network 107 may provide television programming including, for example, programs, advertisements, and videos-on-demand (VOD) via various mediums, including satellite, optical fiber or over-the-air broadcasting. Television programming may also be supplied to destination devices 105 connected to communication network 101 via IP-based protocols (e.g., IPTV). In one embodiment, destination devices 105 may thus receive dynamic content delivery via various communication systems utilized for broadcast TV. Thus, for example, a subscriber to dynamic content delivery service 115 may receive television programming at destination device 105b (e.g., set top box).

As mentioned, traditional communication systems allow users to share dynamic content with each other but also place the burden of configuring various communication parameters and internetworking user equipment on the users. For instance, if a user attempts to receive live video and audio from someone with whom the user has not previously communicated, he or she may not simply request the video and audio to be sent to, for example, "my TV." This is particularly relevant to commercial transactions where users are often dealing with organizations or individuals with whom the user may have no prior acquaintance. Although, for example, video phones may allow the user to see the representative at the other end of a phone call, video phones require special equipment for both parties and are not integrated into a system that provides images, or any dynamic visual content, of the calling party and/or the called party. As a result, users cannot verify whether the product to be purchased works as demonstrated on advertisements and thus cannot mitigate doubts about how to use such a product. Audio communication, without dynamic visual feedback, does not allow the user to go over the functionalities of the product with the representative or to visualize how the product may work in a particular situation.

To address this issue, dynamic content delivery service 115 manages the authorization and technical configuration required for dynamic communication between a source device (e.g., source device 103a) and one or more destination devices 105. Once a request for dynamic content has been authorized and configured, the content is sent through service provider network 107 and/or through communication network 101.

By way of example, a customer may call a retailer (e.g., pet store) and a service representative may suggest the customer to view live video of the pets for sale in the store via the display on a destination device (e.g., destination device 105a) accessible to the customer (e.g., a TV or computer at the office or home of the customer). Based upon the dynamic visual content exchanged in real time via the destination device 105a, the parties may initiate a live video conferencing session between a source device (e.g., source device 103a) and the destination device (e.g., destination device 105a) to allow the customer to interact with the service representative about which pet to purchase, the best route to get to the store, etc.

In another embodiment, source device 103a (e.g., a mobile phone, wireless terminal, laptop, etc.) initially establishes a voice communication session with another source device 103b via communication network 101 and service provider network 107. Subsequently, dynamic content delivery service 115 may recognize a request for live session initiation (including dynamic visual content) from signals received from service provisioning system 109. The recognition of the establishment of a voice session by the service provisioning system 109 was possible because of signals carried by communication network 101. The signals from service provisioning system 109 reach dynamic content delivery service 115 via service provider network 107. Dynamic content delivery service 115 may then identify and locate a destination device (e.g., destination device 105a). Further, dynamic content delivery service 115 may process an authentication request received from source devices 103a to authorize retrieval of dynamic visual content.

Once the authorization is processed, dynamic content delivery service 115 initiates the transmission of the dynamic visual content (e.g., live videos of auction items to be zoomed in/out from all perspectives on demand) from the source device 103a to each destination device 105a-105n that is part of the communication session relating to a service or event (e.g., an auction, a trade show, a seminar, a gaming event, a job fair, a doctor appointment, a speed date event, etc.). The dynamic content delivery service 115 is further detailed in FIG. 4. In this embodiment, the requests from source device 103a can be, for example, for placing a bid, offer, or purchase order for one or more items, for mitigate doubts/concerns about a item/candidate of interest (e.g., a house, a car, a painting, a patient, a date, jewelry, etc.), or for obtaining directions to a particular location, etc. The dynamic visual content can include motion content displayed in real-time. Additionally, the transmission can be to one or more destination devices. In this embodiment at least one source device 103 user is a subscriber of the services offered through service provider network 107.

It is contemplated that communication network 101 and service provider network 107 are networks capable of transmitting voice from a source device (e.g., source device 103a) to a destination device (e.g., destination device 105a) including, for example, a wireless network, a telephony network, a public switched telephone network, etc. It is also contemplated that the wireless network may be, for example, a cellular network (2G, 3G, 4G, or above) and may employ various technologies including, for example, code division multiple access (CDMA), enhanced data rates for global evolution (EDGE), general packet radio service (GPRS), global system for mobile communications (GSM), universal mobile telecommunications system (UMTS), etc., as well as any other suitable wireless medium, e.g., microwave access (WiMAX), Long Term Evolution (LTE) networks, wireless fidelity (WiFi), satellite, and the like.

Furthermore, it is contemplated that communication network 101 and service provider network 107 may be any local area network (LAN), metropolitan area network (MAN), wide area network (WAN), the Internet, or any other suitable network, such as a commercially owned, proprietary packet-switched network, e.g., a proprietary cable or fiber-optic network. Communication network 101 and service provider network 107 may include session control capabilities such as those provided by the Internet protocol multimedia subsystem (IMS). Communication network 101 and service provider network 107 supports a variety of communications sessions (e.g., voice, video, text messaging, electronic mail (e-mail), instant messaging, etc.) conducted on any device capable of communicating over the data network.

It is contemplated that the each of the destination devices 105a-105n can be any device with a display screen (e.g., desktop computer, laptop computer, PDA, set-top box, or television) capable of communicating over a communication network and of displaying visual content (e.g., images, videos, etc.). Source device 103a may also be one of destination devices 105a-105n. Examples of source devices 103 may include a mobile smart phone, a mobile feature phone, a phone connected to a PSTN, PDA, a PC, as well as other like technologies and customer premises equipment (CPE).

Figure 2:
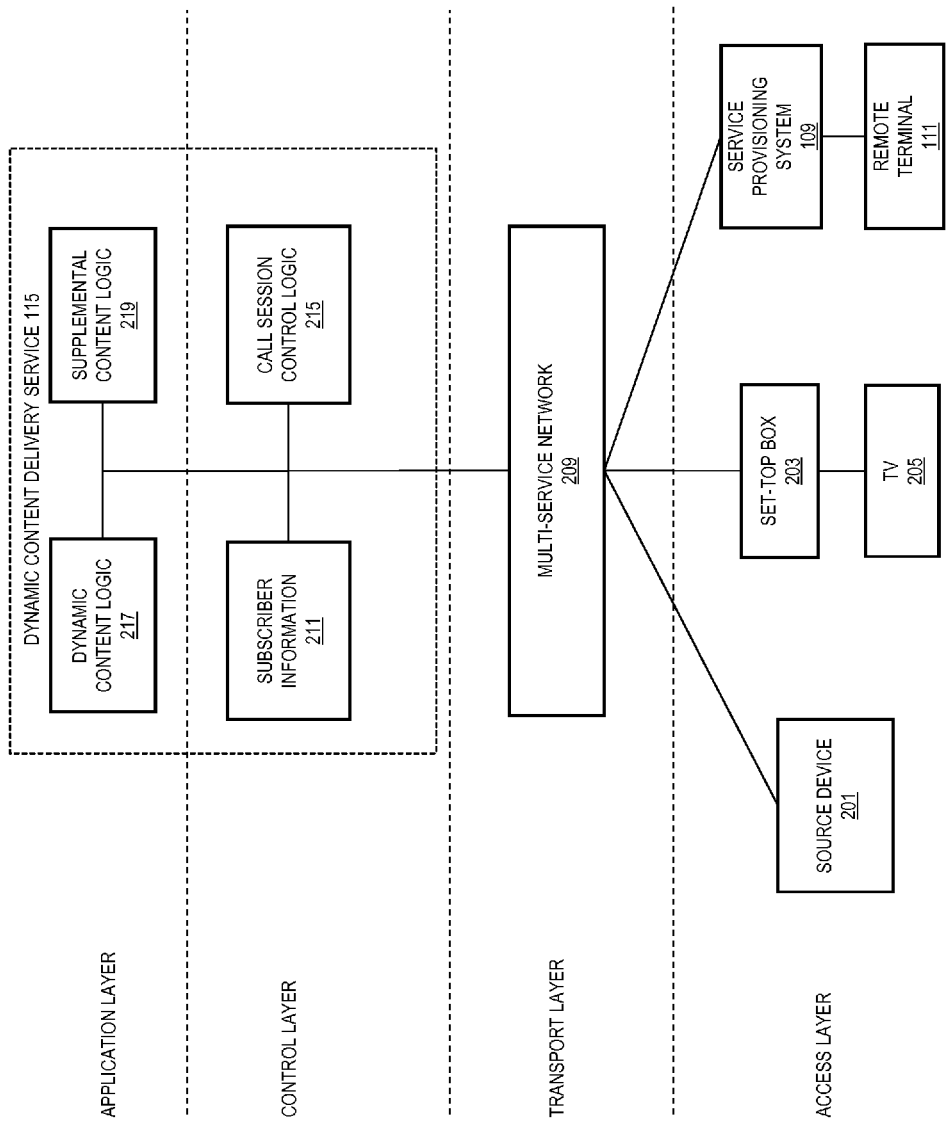
FIG. 2 illustrates the layers of an information management system providing dynamic content delivery, according to an exemplary embodiment.

FIG. 2 illustrates the layers of an information management system providing dynamic content delivery, according to an exemplary embodiment. In one embodiment, system 100 employs application, control, transport, and access layers organized in a hierarchy of network services. The services may be provided by software components executing on computing systems in accordance with specific protocols and communication parameters.

By way of example, source device 201 may be a mobile phone equipped with a video camera that is source of a live video stream shared with TV 205 (via set-top box 203). In a related example, remote terminal 111 may be a webcam-equipped computer that is the source of another live video session shared with TV 205. As shown, these devices connect to dynamic content delivery service 115 via multi-service network 209 of the transport layer. In one embodiment, multi-service network 209 may be an IP/MPLS core network transparently interconnecting access networks. Devices at the access layer may connect to multi-service network 209 via these access networks, which may include wireless, PSTN, cable, optical fiber, and other access networking technologies. Multi-service network 209 also routes control and data traffic to the control and application layers of dynamic content delivery service 115.

As shown, dynamic content delivery service 115 may include components of services offered at both the application and control layers. Specifically, the application and control layers may interact to manage the sharing of dynamic and supplemental content between one or more devices found at the access layer (e.g., between source device 201 and set top box 203). In one embodiment, an incoming request from a user is first processed by call session control logic 215. The request may contain user information, including authentication information that may be verified based on stored subscriber information 211. Further, call session control logic 215 may attempt to locate the destination device for delivery of the dynamic content. After authentication, authorization, and location of the destination device, call session control logic 215 may trigger dynamic content logic 217 to deliver content to the destination device (e.g., set-top box 203).

Subscriber information 211 may be a database that supports call session control logic 215 to authorize, authenticate and establish dynamic content delivery sessions between source device 201 and one or more destination devices 105 (e.g., set-top box 203). For example, a request from a subscriber attempting to send live video from source device 201 to set-top box 203 may be transmitted through multi-service network 209 and intercepted by call session control logic 215 which utilizes subscriber information 211 to perform the authentication and authorization of the subscriber.

Depending on the type of content requested (dynamic or non-dynamic), either dynamic content logic 217 or supplemental content logic 219, respectively, will be triggered. In the case of dynamic content, the application layer will manage the transmission of dynamic content by establishing a connection to the destination device utilizing the subscriber information of the recipient. After successful session establishment, the dynamic visual content is sent to TV 205 through multi-service network 209, after set-top box 203 turns the source signal into content to be displayed at TV 205.

Figure 3:
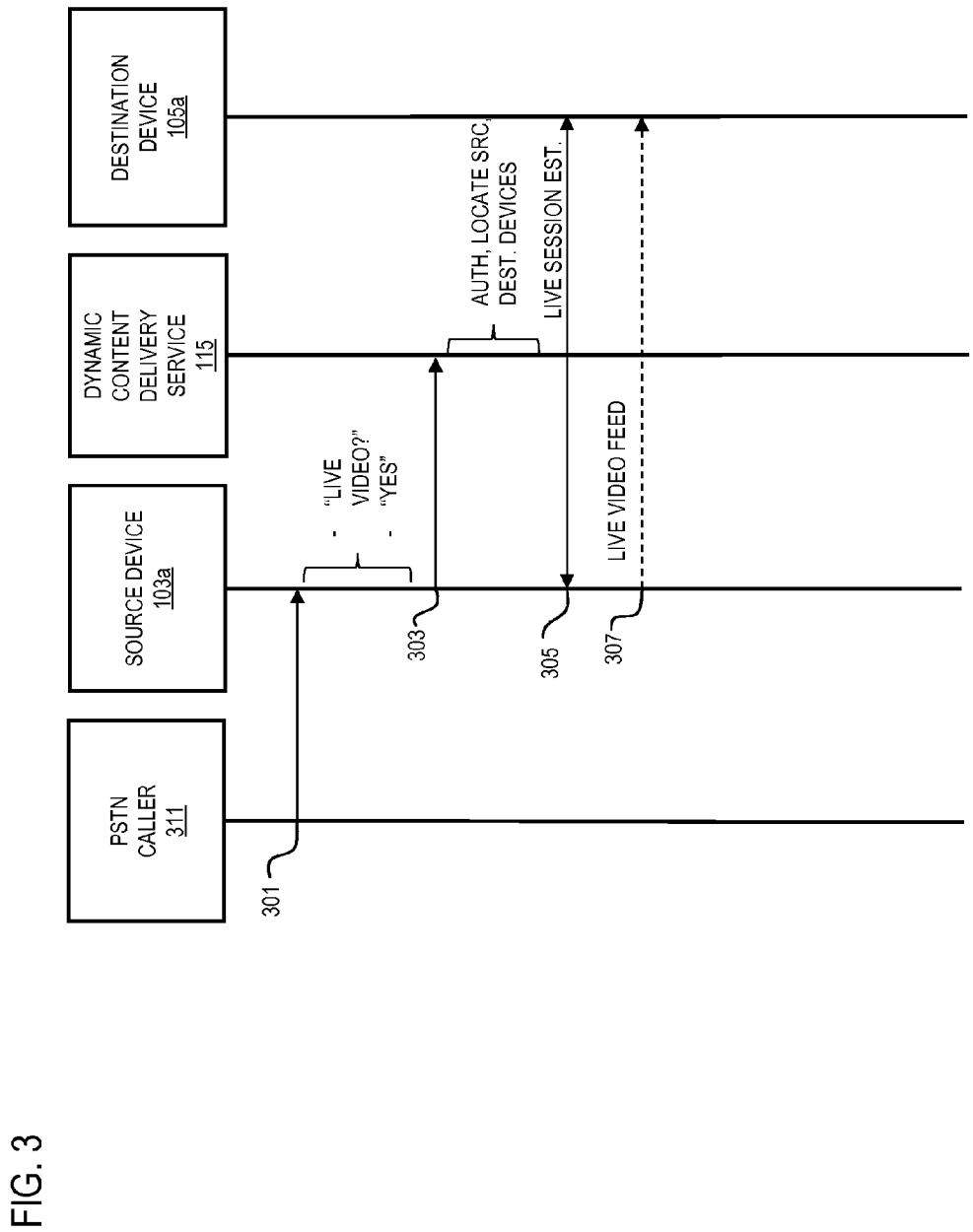
FIG. 3 is a ladder diagram of an exemplary process for providing dynamic visual content, according to an exemplary embodiment.

FIG. 3 is a ladder diagram of an exemplary process for providing dynamic visual content, according to an exemplary embodiment. For purposes of illustration, a customer of, e.g., a real estate brokerage service, may be attempting to obtain more detailed information about a particular property without physically travelling to the property. An agent of the brokerage service may be on-site at the property and can provide a live video tour of the property directly from his or her mobile phone to the customer's desired destination device (e.g., a TV).

Various alternative forms for the initial contact are contemplated. For example, the initial contact may be via an automated customer support system. Such a system may recognize the command for establishment of a dynamic content sharing session and automatically configure dynamic content delivery service 115 to send content to the customer's desired destination device. It is contemplated that this command may take a form of a dialed number, a spoken word or phrase. Thus, a customer may interact with an answering system that can ask the customer whether he or she wishes to establish a real-time video session and the customer may acquiesce. In general, the initial request may be processed by any device capable of receiving and send commands over a network.

In step 301, a PSTN caller 311 initiates a voice call to source device 103a. Source device 103a may be a camera-equipped mobile phone that has been registered by its owner with dynamic content delivery service 115. After the voice call has been established, the party answering the voice call may offer to share dynamic content with the caller at a destination device 105a of his or her choice. Continuing with our example, the agent of the real estate brokerage service may offer to provide a live video feed via her mobile phone as he or she tours a property of interest to the caller. The caller may indicate a particular device to which the live video feed should be directed and the agent may then attempt to establish a live session via dynamic content delivery service 115.

In step 303, source device 103a initiates a request to dynamic content delivery service 115. In one embodiment, the request contains information to locate the desired destination device. The request may also contain information to locate, authenticate, and authorize source device 103a. In response to the request, dynamic content delivery service 115 locates and authorizes (and optionally authenticates) source and destination devices 103a and 105a, respectively. Referring back to FIG. 2, call session control logic 215 may intercept the request and utilize subscriber information 211 to determine whether the source and destination devices are authorized to obtain dynamic content delivery. Call session control logic 215 may also attempt to determine the location of the source and destination devices with respect to service provider network 107 if, for example, one or both of the devices are connected via intermediary service provider networks (not shown in FIG. 1 for illustrative convenience).

In step 305, dynamic content delivery service 115 establishes the connection for delivery of the dynamic content between the source device 103a and destination device 105a. In one embodiment, the process, per step 305, may involve the sharing of location and network addressing information among the devices via one or more session initiation protocols so that they may be able to communicate directly. After a connection has been established, call session control logic 215 of dynamic content delivery service 115 may monitor the call and its duration for additional requests or modifications to the initial request.

In step 307, a live video feed is sent from source device 103a to destination device 105a. As mentioned, dynamic content delivery service 115 may continue to monitor the video feed via call session control logic 215. In one embodiment, dynamic content delivery service 115 may include transmission of the dynamic content back to source device 103a from destination devices 105. That is, bi-directional live video may be established in step 305 so that the source device 103 may also receive dynamic content from the destination device 105a. In such embodiments, destination device 105a will be equipped to capture dynamic content (e.g., a camera or microphone).

Figure 4:
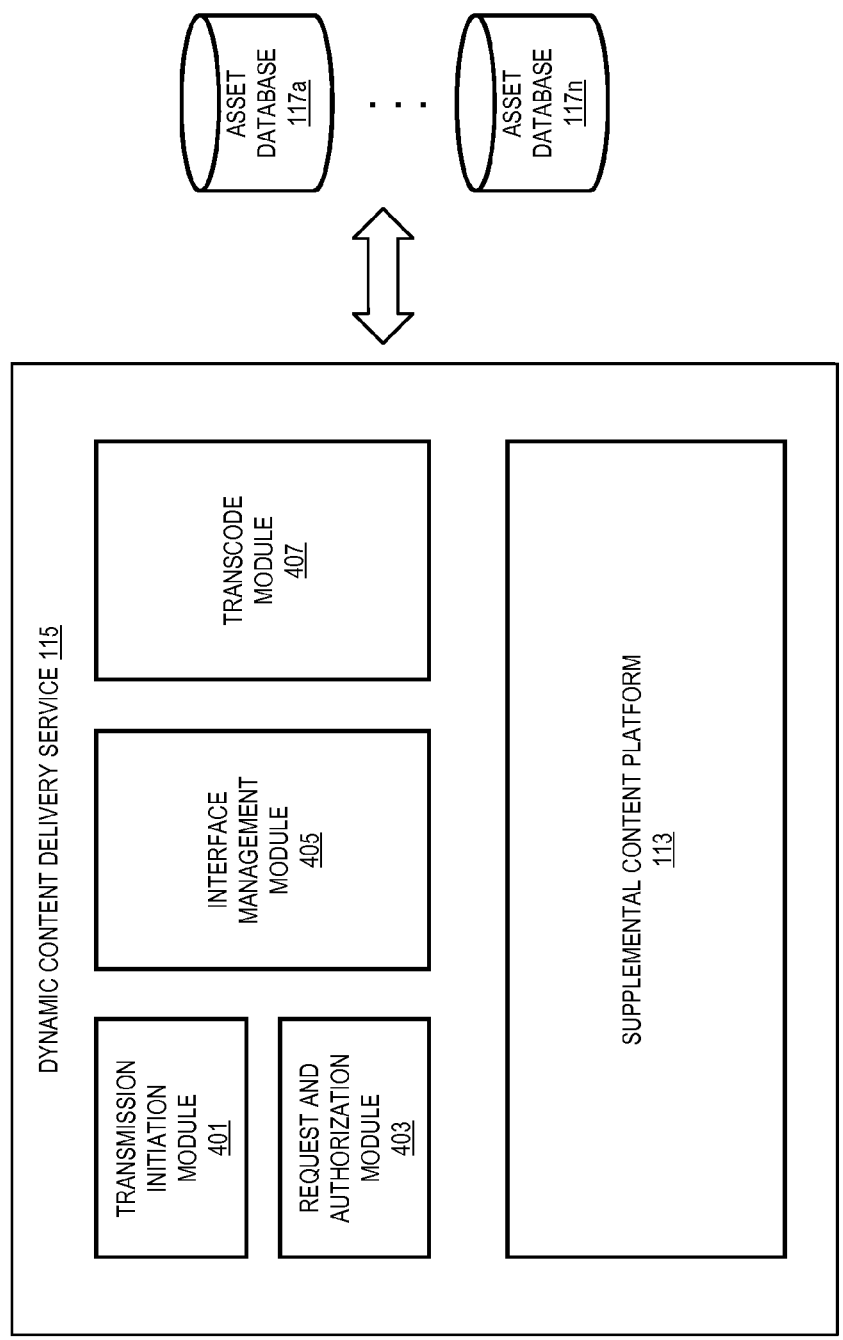
FIG. 4 is a diagram of the components of dynamic content delivery service, according to an exemplary embodiment.

FIG. 4 is a diagram of the components of dynamic content delivery service 115, according to an exemplary embodiment. Dynamic content delivery service 115 may comprise computing hardware (such as described with respect to FIG. 7), as well as include one or more components configured to execute the processes described herein for providing dynamic content delivery in system 100. It is contemplated that the functions of these components may be combined in one or more components or performed by other components of equivalent functionality. In this embodiment, dynamic content delivery service 115 includes the following components: a transmission initiation module 401, a request and authorization module 403, an interface management module 405, and transcode module 407. In addition, supplemental content platform 113 may be a component of dynamic content delivery service 115 and may be responsible for delivery of non-dynamic content.

Transmission initiation module 401 may establish, for example, a live video feed between a source device (e.g., source device 103a) and a destination device (e.g., destination device 105a). In one embodiment, the video feed may be a one-way video transmission. Alternatively, a bi-directional video feed may also be established by transmission initiation module 401. It is contemplated that transmission initiation module 401 is able to create, modify and to terminate two-party (unicast) or multiparty (multicast) sessions. Furthermore, it may utilize various communication protocols, including (but not limited to) Transmission Control Protocol (TCP), User Datagram Protocol (UDP), or Stream Control Transmission Protocol (SCTP).

Request and authorization module 403 may receive, process, and authorize requests for dynamic content delivery received from a source device (e.g., source device 103a). In one embodiment, request and authorization module 403 may include functionality of call session control logic 215. Thus, it may process requests by, for example, authenticating, authorizing, and locating both the source device (e.g., source device 103a) and the destination device (e.g., destination device 105a). Request and authorization module 403 may also utilize subscriber information 211 to determine the appropriate service authorization and authentication information related to a particular source and/or destination device. Once a request has been processed, request and authorization module 403 may further trigger transmission initiation module 401 to initiate content delivery.

Dynamic content delivery service 115 may utilize asset databases 117 storing subscriber data, including multimedia format data stored for later retrieval. For example, a real estate brokerage service may save images of houses, applications created for virtual tours at the houses in the portfolio, among other data, including user preference information. These preferences include, for example, information of what destination device 105a-105n the visual content had been previously transmitted to.

Interface management module 405 allows subscribers to develop customized user interfaces for the recipients of dynamic content. In one embodiment, interface management module 405 may support a user-friendly self-service virtual portal to update and maintain dynamic (and non-dynamic) content. For example, a real estate brokerage service may be able to log onto the platform via a web portal to create and manage content for particular customers. It may also allow the brokerage service to require various forms of authentication prior from customers or decide to block certain customers entirely. In another embodiment, interface management module 405 may allow subscribers to install software applications developed by third-party software developers. Thus, interface management module 405 may also provide a platform for developing an ecosystem of applications and content delivery systems to third-party developers.

Transcode module 407 allows dynamic content delivery service 115 to transcode among various media formats. Furthermore, the transcode module 407 can convert assets, such as image, sound, text and video, thus optionally assisting supplemental content platform 113 to transcode its non-dynamic content. It is contemplated that the transcode module 407 can convert among traditional and emerging multimedia formats, including Beta, VHS, QuickTime, MPEG, WMVNC-1, H.264, Flash 8 & 9, 3GPP, MPEG-2, MPEG-4, Real Media, MP3, AAC, WAV, WMA, AMR-NB, etc. Thus, transcode module 407 enables dynamic content delivery service 115 to be established between source and destination devices with different media transmission and reception capabilities. It is also contemplated that the transcode device 407 can covert the content in real-time. In one embodiment, transcode module 407 may also convert between various static content forms so that the content can be displayed in devices with different display sizes and resolutions.

Figure 5:
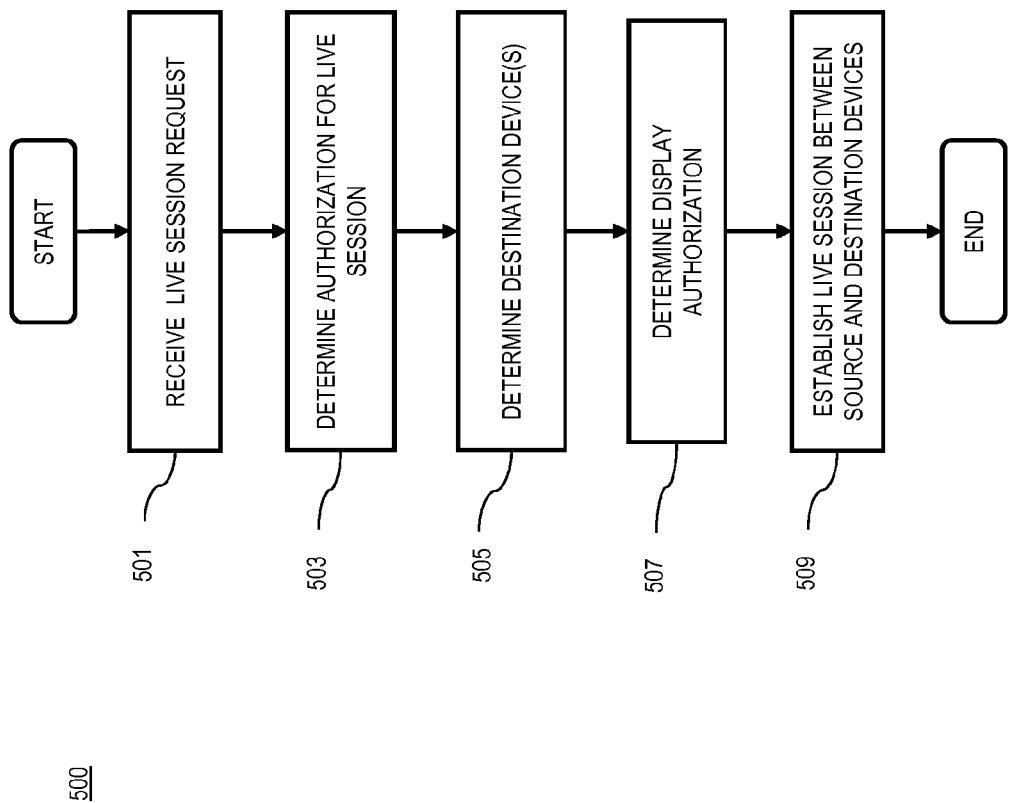
FIG. 5 is a flowchart of a process for providing dynamic content delivery, according to an exemplary embodiment.

FIG. 5 is a flowchart of a process for providing dynamic content delivery, according to an exemplary embodiment. For illustrative purpose, process 500 is described with respect to the system of FIG. 1. It is noted that the steps of process 500 may be performed in any suitable order, as well as combined or separated in any suitable manner.

In step 501, dynamic content delivery service 115 receives a service request. In one embodiment, the service request may include authentication and location information of a source device (e.g., source device 103a) and information regarding the destination device (e.g., destination device 105a). It is contemplated that the service request may originate from any one of a number of devices, including but not limited source device 103a. Thus, the service request may also be received from service provisioning system 109 or remote terminal 111. It is further contemplated that the service request may be received from a source device (e.g., source device 103a) that is already connected to destination device (e.g., destination device 105a) in order to add dynamic content to the connection. The service request may take a variety of forms, including voice commands sent to an automated answering system or to a live agent conversing with the party transmitting the service request.

In step 503, dynamic content delivery service 115 authenticates the requesting user and verifies authorization for retrieval against the user's subscription. In one embodiment, step 503 may involve utilizing subscription information 211 to authenticate the user based on supplied authentication information.

In step 505, dynamic content delivery service 115 determines one or more destination devices (e.g., destination devices 105) to direct the visual content. In one embodiment, step 505 may involve locating a destination device (e.g., destination device 105a) based on the service request obtained in step 501. For example, dynamic content delivery service 115 may perform a lookup of the registered devices belonging to a particular user and then determine a particular device the user desires to receive the dynamic content at. Associated with the list of registered devices may be a list of identifiers or authorization tokens to ensure correct selection of the destination for the content delivery. The process, per step 505, may also involve determining an appropriate transcoding module (if the formats of the source and destination devices differ) to ensure that the delivered content is suitably received at the destination device. Dynamic content delivery service 115 may also determine user preference information for determining the destination device. In one embodiment, user preference information may also be retrieved from subscriber information 211.

In step 507, service provider network 107 determines whether the user authorized the visual content to be displayed in their screen. In step 507, the visual content is transmitted to the one or more destination devices 105a-105n over a communication session that is separate from the voice communication session.

It is noted that the communication may initially start with simply a voice call, and continue with a subsequent one-way/two-way video feed, including dynamic video content. As the conversation progresses, other visual content may be exchanged. That is, the first service request is received, and a communication channel is established. Thereafter, additional service requests can be received, resulting in operations that are either the same as or different from that of the first service request. The two-way visually interactive communication channel which may include one-way or two-way video, as well as real-time video, images, animated text, simply text-based content, etc. pushed to the users target device(s). An example is a retailer for home improvement products, where a customer calls to order an automatic saw and a visual channel is established but no video is yet provided. However, if the customer is asking about how to properly handle a product then a real-time video is established between the user and the sale representative of the retailer.

Figure 6:
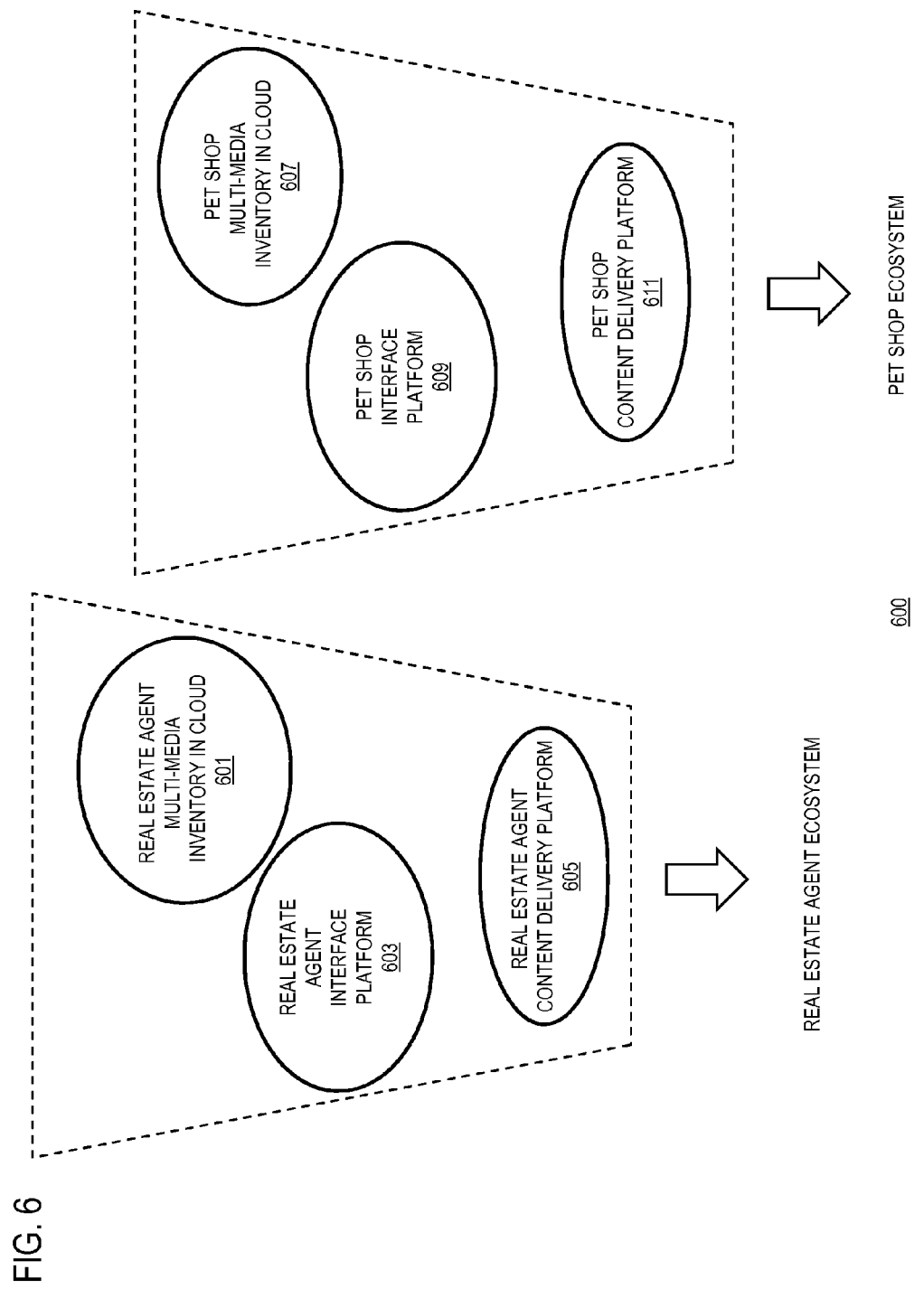
FIG. 6 is a diagram of dynamic content delivery ecosystems, according to an exemplary embodiment.

FIG. 6 is a diagram of dynamic content delivery ecosystems, according to an exemplary embodiment. As mentioned, an ecosystem refers to the software and hardware computing and communicating resources used for managing and facilitating the delivery of dynamic content for a particular user. In one embodiment, each of the ecosystems 600 may include an interface platform, a multi-media content inventory, and a content delivery platform. For example, an ecosystem for a real estate brokerage service may include a real estate multi-media inventory in cloud 601, a real estate agent interface platform 603, and real estate a content delivery platform 605 customized for the brokerage service. Similarly, for example, an ecosystem for a pet shop may include a pet shop multi-media inventory in cloud 607, an pet shop interface platform 609, and a pet shop content delivery platform 611 customized to the business needs of the pet shop. Customers of the real estate brokerage service or the pet shop may interact with an ecosystem utilizing specific applications or web portals designed to interact with the content delivery system of each ecosystem. Further, it is contemplated that the real estate brokerage service and the pet shop may add, remove, or modify the ecosystem depending on their business needs. There may be several other commercial or non-commercial ecosystems in addition to the real estate agent ecosystem and to the pet shop ecosystem.

While the content and applications may differ among ecosystems, the overall architecture of an ecosystem may be described with respect to certain shared features and capabilities. In one embodiment, the multimedia inventory of a particular subscriber may include the dynamic content to be shared via dynamic content delivery service 115. For example, real estate agent multi-media inventory in cloud 601 may include a framework for generating content based on photos, images, video, customer preferences, personal information, etc. The multimedia inventory may not be stored in a cloud-based storage service or other data storage systems.

In one embodiment, the user interface platform (e.g., real estate interface platform 603) may include various software components to generate various user interfaces for destination devices 105. For example, real estate agent user interface platform 603 may include software that provides a customized user interface to search for homes, capable of enabling the users to interact with the system and to add, remove, move or modify data stored in the real estate agent multi-media inventory in cloud 601. Additionally, real estate agent interface platform 603 may enable the real estate agent to create other platforms and ecosystems, such as the pet shop ecosystem.

The functions of the pet shop multi-media inventory in cloud 607, a pet shop interface platform 609, and the pet shop content delivery platform 611, corresponds respectively to the functions of the real estate agent multi-media inventory in cloud 601, a real estate interface platform 603, a real estate agent content delivery platform 605, however, within the pets shop ecosystem, as opposed to the real estate agent ecosystem. It is contemplated that the content delivery platform of each ecosystem may be configured to interact with other ecosystems, including ecosystems from a different service provider.

The processes described herein for providing dynamic content delivery may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
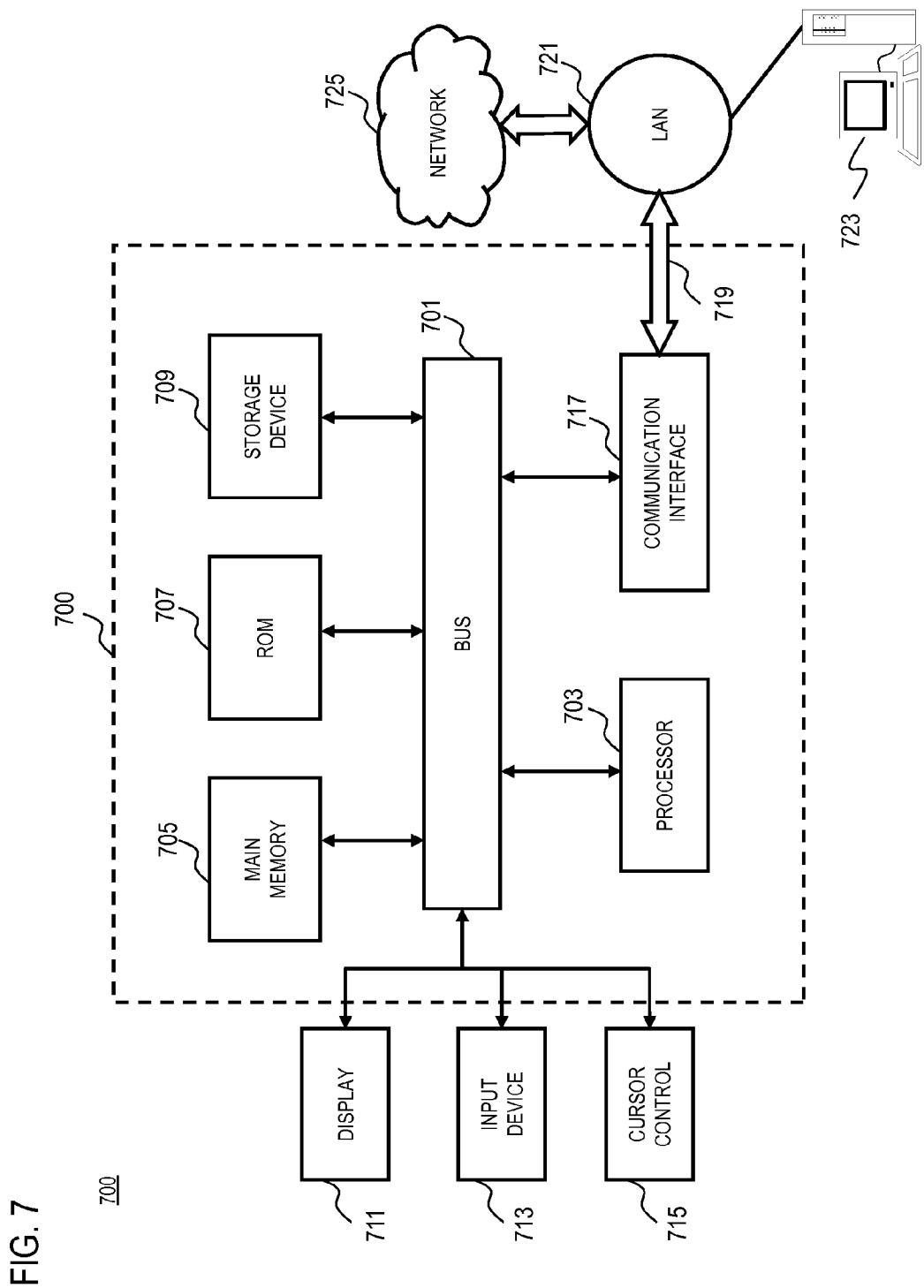
FIG. 7 illustrates computing hardware (e.g., computer system) upon which an embodiment according to the invention can be implemented.

FIG. 7 illustrates computing hardware (e.g., computer system) upon which an embodiment according to the invention can be implemented. The computer system 700 includes a bus 701 or other communication mechanism for communicating information and a processor 703 coupled to the bus 701 for processing information. The computer system 700 also includes main memory 705, such as random access memory (RAM) or other dynamic storage device, coupled to the bus 701 for storing information and instructions to be executed by the processor 703. Main memory 705 also can be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to an embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multiprocessing arrangement may also be employed to execute the instructions contained in main memory 705. In alternative embodiments, hard-wired circuitry may be used in place of or in combination with software instructions to implement the embodiment of the invention. Thus, embodiments of the invention are not limited to any specific combination of hardware circuitry and software.

Figure 8:
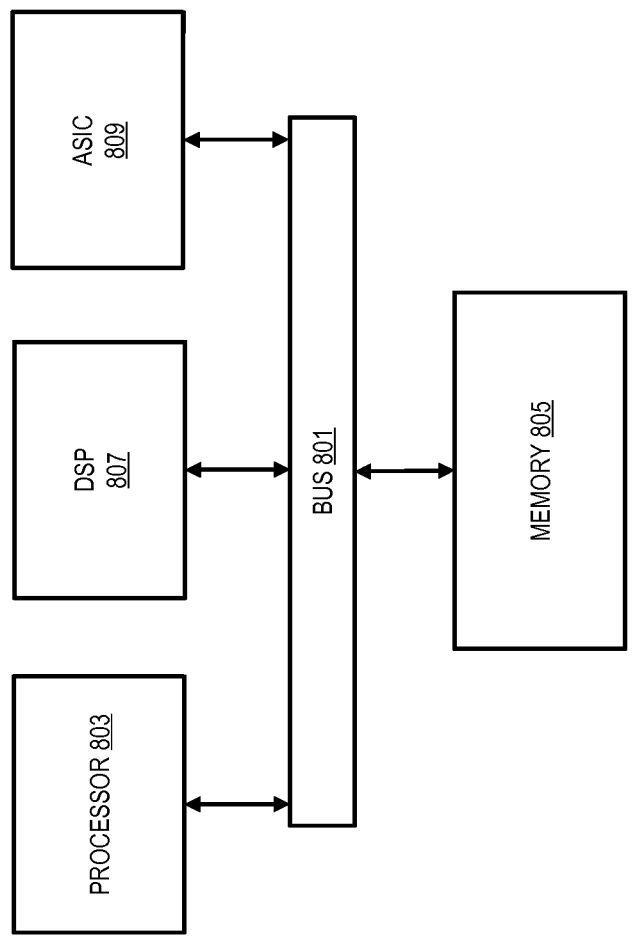
FIG. 8 illustrates a chip set upon which an embodiment of the invention may be implemented.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be LAN card (e.g. for Ethernet™ or an Asynchronous Transfer Mode (ATM) network)

to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 8, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an embodiment of the invention through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a PDA or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 8 illustrates a chip set 800 upon which an embodiment of the invention may be implemented. The chip set 800 is programmed to initiate a service observing session as described herein and includes, for instance, the processor and memory components described with respect to FIG. 7 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 800, or a portion thereof, constitutes a means for performing one or more steps of FIGS. 5-6.

In one embodiment, the chip set 800 includes a communication mechanism such as a bus 801 for passing information among the components of the chip set 800. A processor 803 has connectivity to the bus 801 to execute instructions and process information stored in, for example, a memory 805. The processor 803 may include one or more processing cores with each core configured to perform independently. A multi-core processor enables multiprocessing within a single physical package. Examples of a multi-core processor include two, four, eight, or greater numbers of processing cores. Alternatively or in addition, the processor 803 may include one or more microprocessors configured in tandem via the bus 801 to enable independent execution of instructions, pipelining, and multithreading. The processor 803 may also be accompanied with one or more specialized components to perform certain processing functions and tasks such as one or more digital signal processors (DSP) 807, or one or more application-specific integrated circuits (ASIC) 809. A DSP 807 typically is configured to process real-world signals (e.g., sound) in real time independently of the processor 803. Similarly, an ASIC 809 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 803 and accompanying components have connectivity to the memory 805 via the bus 801. The memory 805 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set top box based on device events. The memory 805 also stores the data associated with or generated by the execution of the inventive steps.

While certain exemplary embodiments and implementations have been described herein, other embodiments and modifications will be apparent from this description.

Accordingly, the invention is not limited to such embodiments, but rather to the broader scope of the presented claims and various obvious modifications and equivalent arrangements.

What is claimed is:

1. A method comprising:
receiving a request including authentication information associated with verifying the request based on subscriber information associated with a user device, via a voice communication session with the user device, for delivering visual content that includes the dynamic content,
wherein authorizing the user device to access the dynamic content is based on the subscriber information;
determining, utilizing a processor, based on the received request, a plurality of destination devices to direct the visual content to, wherein the plurality of destination devices includes the user device;
authorizing transmission of the requested visual content to the plurality of destination devices based, at least in part, on the determining of the plurality of destination devices, the subscriber information associated with the user device and other information associated with the plurality of destination devices; and
initiating transmission of the requested visual content to the plurality of destination devices over a data communication session that is separate from and concurrent with the voice communication session.

2. A method of claim 1, further comprising:
receiving registration information associated with the user device; and
causing transmission of the visual content that includes a live feed as at least part of the dynamic content,
wherein the other information associated with the plurality of destination devices includes one of an identifier, authorization information or a combination thereof,
wherein the visual content includes routing information that is based on a location of the user device, and is transmitted from a content delivery ecosystem,
wherein the content delivery ecosystem transmits, at least in part, customized visual content based, at least in part, on one or more preferences of users of the plurality of destination devices.

3. A method of claim 1, further comprising:
retrieving the dynamic content from a cloud, prior to the transmission of the visual content.

4. A method of claim 1, further comprising:
authenticating the user device; and
filtering the request based, at least in part, on a subscription associated with the user device.

5. A method of claim 1, further comprising:
causing, at least in part, the determination of the plurality of destination devices based, at least in part, on user preference information.

6. A method of claim 1, wherein the plurality of destination devices include a set-top box.

7. An apparatus comprising:
at least one processor; and
at least one memory including computer program code for one or more programs,
the at least one memory and the computer program code configured to, with the at least one processor, cause the apparatus to perform at least the following,
receive a request including authentication information associated with verifying the request based on subscriber information associated with a user device via a voice communication session with the user device, for delivering visual content that includes the dynamic content,
wherein authorizing the user device to access the dynamic content is based on the subscriber information;
determine, based on the received request, a plurality of destination devices to direct the visual content to, wherein the plurality of destination devices includes the user device,
authorize transmission of the requested visual content to the plurality of destination devices based, at least in part, on the determining of the plurality of destination devices, the subscriber information associated with the user device and other information associated with the plurality of destination devices, and
initialize the transmission of the requested visual content to the plurality of destination devices over a data communication session that is separate from and concurrent with the voice communication session.

8. An apparatus of claim 7, wherein the apparatus is further caused to:
receive registration information associated with the user device, and
transmit the visual content including a live feed as at least part of the dynamic content,
wherein the other information associated with the plurality of destination devices includes one of an identifier, authorization information or a combination thereof,
wherein the visual content includes routing information that is based on a location of the user device, and is transmitted from a content delivery ecosystem,
wherein the content delivery ecosystem transmits, at least in part, customized visual content based, at least in part, on one or more preferences of users of the plurality of destination devices.

9. An apparatus of claim 7, wherein the apparatus is further caused to:
retrieve dynamic visual content from a cloud, prior from being caused to transmit the visual content.

10. An apparatus of claim 7, wherein the apparatus is further caused to:
authenticate the user device; and
filter the request based, at least in part, on a subscription associated with the user device.

11. An apparatus of claim 7, wherein the apparatus is further caused to:
cause, at least in part, the determination of the plurality of destination devices based, at least in part, on user preference information.

12. An apparatus of claim 7, wherein the plurality of destination devices include a set-top box.

13. A dynamic content delivery system comprising:
a voice service provider system configured to receive a request including authentication information associated with verifying the request based on subscriber information associated with a user device, via a voice communication session with the user device, for delivering visual content that includes the dynamic content,
wherein authorizing the user device to access the dynamic content is based on the subscriber information; and
a data service provider system configured to determine, based on the received request, one or more of a plurality of destination devices to direct the visual content, wherein the plurality of destination devices includes the user device, and authorize transmission of the requested visual content to the plurality of destination devices based, at least in part, on the determining of the plurality of destination devices, the subscriber information associated with the user device and other information associated with the plurality of destination devices;

the data service provider system being further configured to initialize the transmission of the requested visual content to the plurality of destination devices over a data communication session that is separate from and concurrent with the voice communication session.

14. A dynamic content delivery system of claim 13, wherein the voice service provider system is further configured to receive registration information associated with the user device, and cause the transmission of the visual content that includes a live feed as at least part of the dynamic content, wherein the other information associated with the plurality of destination devices includes one of an identifier, authorization information or a combination thereof, wherein the visual content includes routing information that is based on a location of the user device, and is transmitted from a content delivery ecosystem, wherein the content delivery ecosystem transmits, at least in part, customized visual content based, at least in part, on one or more preferences of users of the plurality of destination devices.

15. A dynamic content delivery system of claim 13, wherein the data service provider system is further configured to retrieve the dynamic content from a cloud, prior to the transmission of visual content.

16. A dynamic content delivery system of claim 13, wherein the voice service provider system is further configured to authenticate the user device; and to filter the request based, at least in part on a subscription associated with the user device.

17. A dynamic content delivery system of claim 13, wherein the data service provider system is further configured to, at least in part, the determination of the plurality of destination devices based, at least in part, on user preference information.

* * * * *